No. 611,382.  
Patented Sept. 27, 1898.  
J. KERL.  
HORSE HAY RAKE.  
(Application filed Dec. 27, 1897.)  
(No Model.)  
4 Sheets—Sheet 1.

Witnesses  
T. W. Riley  
Chas. B. Brock

Inventor  
John Kerl,  
by O'Meara & Co.  
Attorneys

THE NORRIS PETERS CO., PHOTO-LITHO., WASHINGTON, D. C.

No. 611,382. Patented Sept. 27, 1898.
J. KERL.
HORSE HAY RAKE.
(Application filed Dec. 27, 1897.)
(No Model.) 4 Sheets—Sheet 2.

Witnesses
T. W. Riley
Chas E Brock

Inventor
John Kerl,
by O'Meara & Co
Attorneys

THE NORRIS PETERS CO., PHOTO-LITHO., WASHINGTON, D. C.

No. 611,382. Patented Sept. 27, 1898.
J. KERL.
HORSE HAY RAKE.
(Application filed Dec. 27, 1897.)
(No Model.) 4 Sheets—Sheet 3.

Witnesses
T. W. Riley,
Chas. P. Brock

Inventor
John Kerl
by
O'Meara &c.
Attorneys

No. 611,382. Patented Sept. 27, 1898.
J. KERL.
HORSE HAY RAKE.
(Application filed Dec. 27, 1897.)
(No Model.) 4 Sheets—Sheet 4.
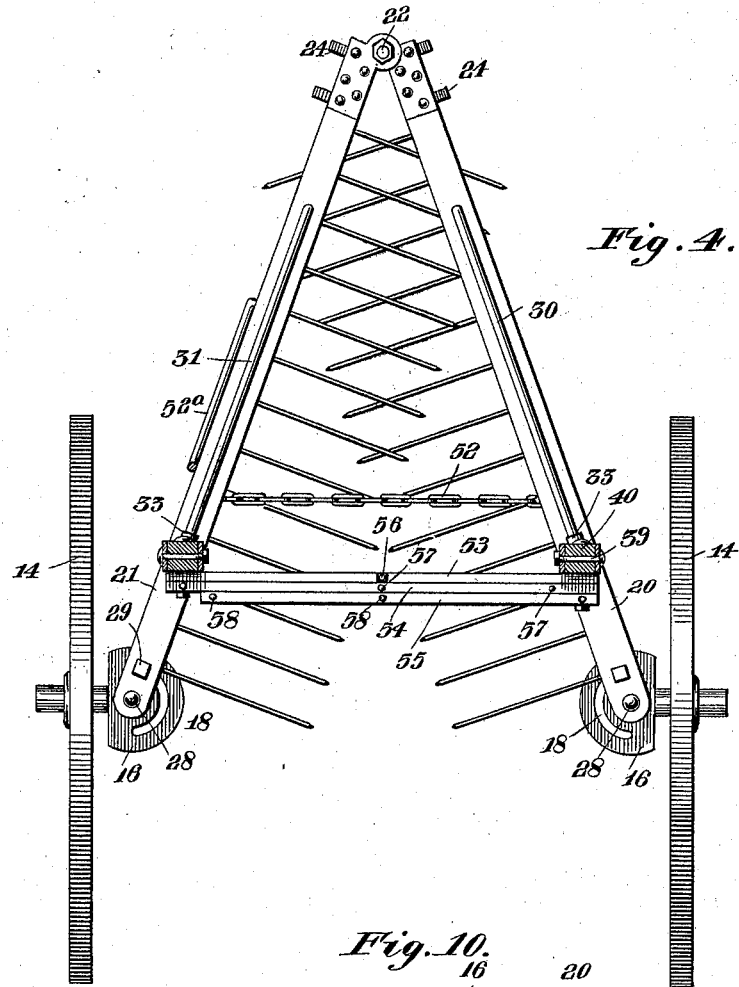
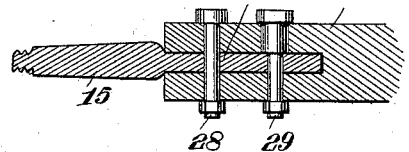
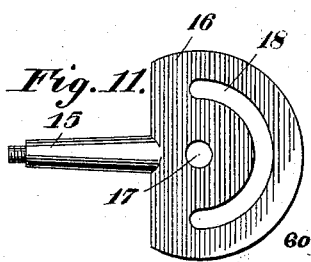 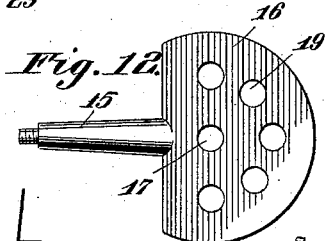
Witnesses
J. W. Riley,
Chas. E. Brock
Inventor
John Kerl,

UNITED STATES PATENT OFFICE.

JOHN KERL, OF NEW FREEDOM, PENNSYLVANIA.

HORSE HAY-RAKE.

SPECIFICATION forming part of Letters Patent No. 611,382, dated September 27, 1898.

Application filed December 27, 1897. Serial No. 663,652. (No model.)

*To all whom it may concern:*

Be it known that I, JOHN KERL, a citizen of the United States, residing at New Freedom, in the county of York and State of Pennsylvania, have invented a new and useful Horse Hay-Rake, of which the following is a specification.

My invention relates to horse hay-rakes, and has for its object to furnish a rake of this class with improved means for folding the rake for moving it from place to place and for providing a folding rake with separately-folding strippers.

With this object in view my invention consists in a horse hay-rake provided with wheels, spindles in said wheels, and cross-beams pivoted to said spindles and centrally to each other, said cross-beams carrying the teeth.

My invention further consists in a horse hay-rake provided with folding beams carrying teeth and folding bars carrying strippers adapted to be folded out of the way when not in use.

My invention further consists in the improved construction, arrangement, and combination of parts hereinafter fully described and afterward specifically pointed out in the appended claims.

In order to enable others skilled in the art to which my invention most nearly appertains to make and use the same, I will now proceed to describe its construction and operation, reference being had to the accompanying drawings, forming part of this specification, in which—

Figure 1:
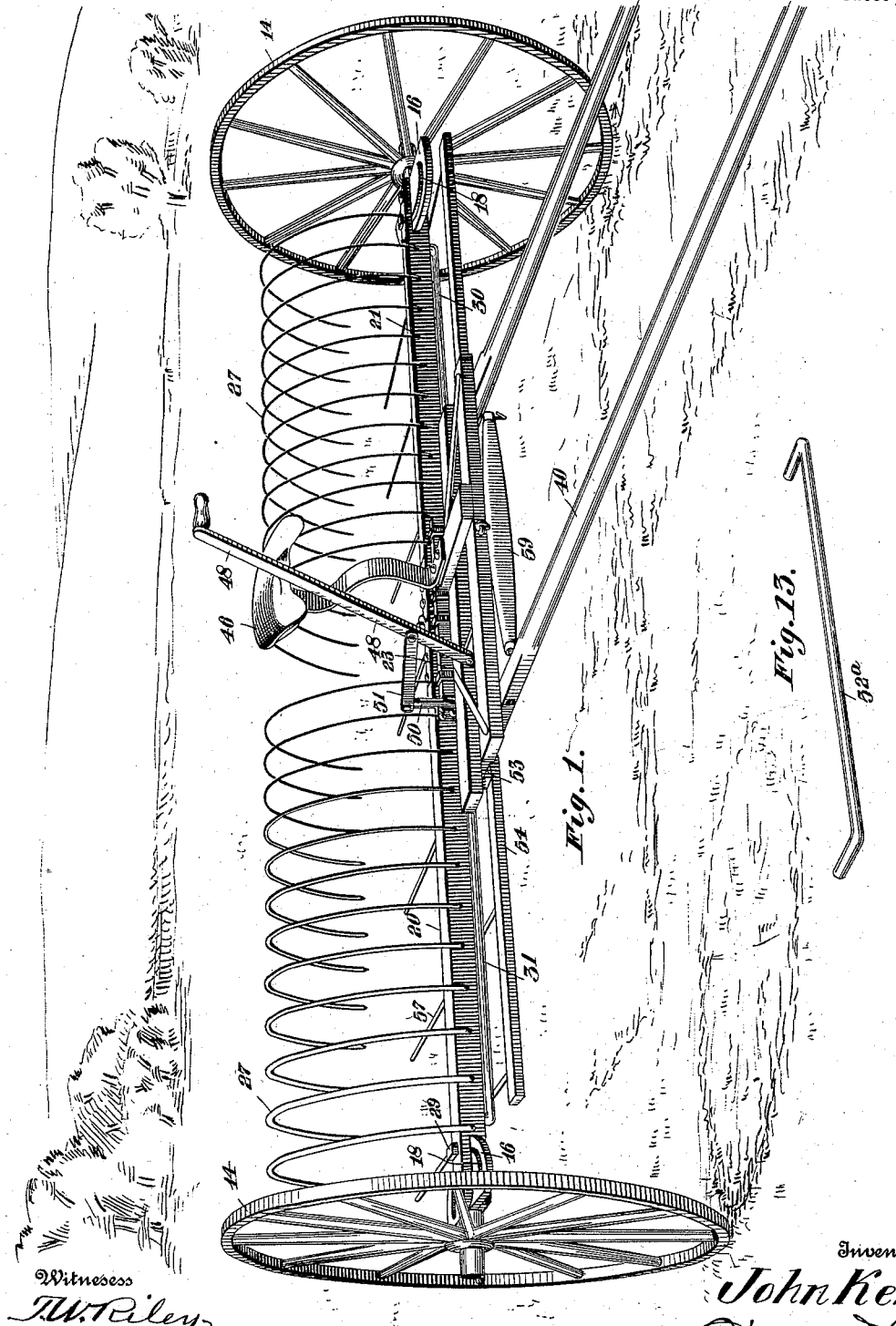
Figure 2:
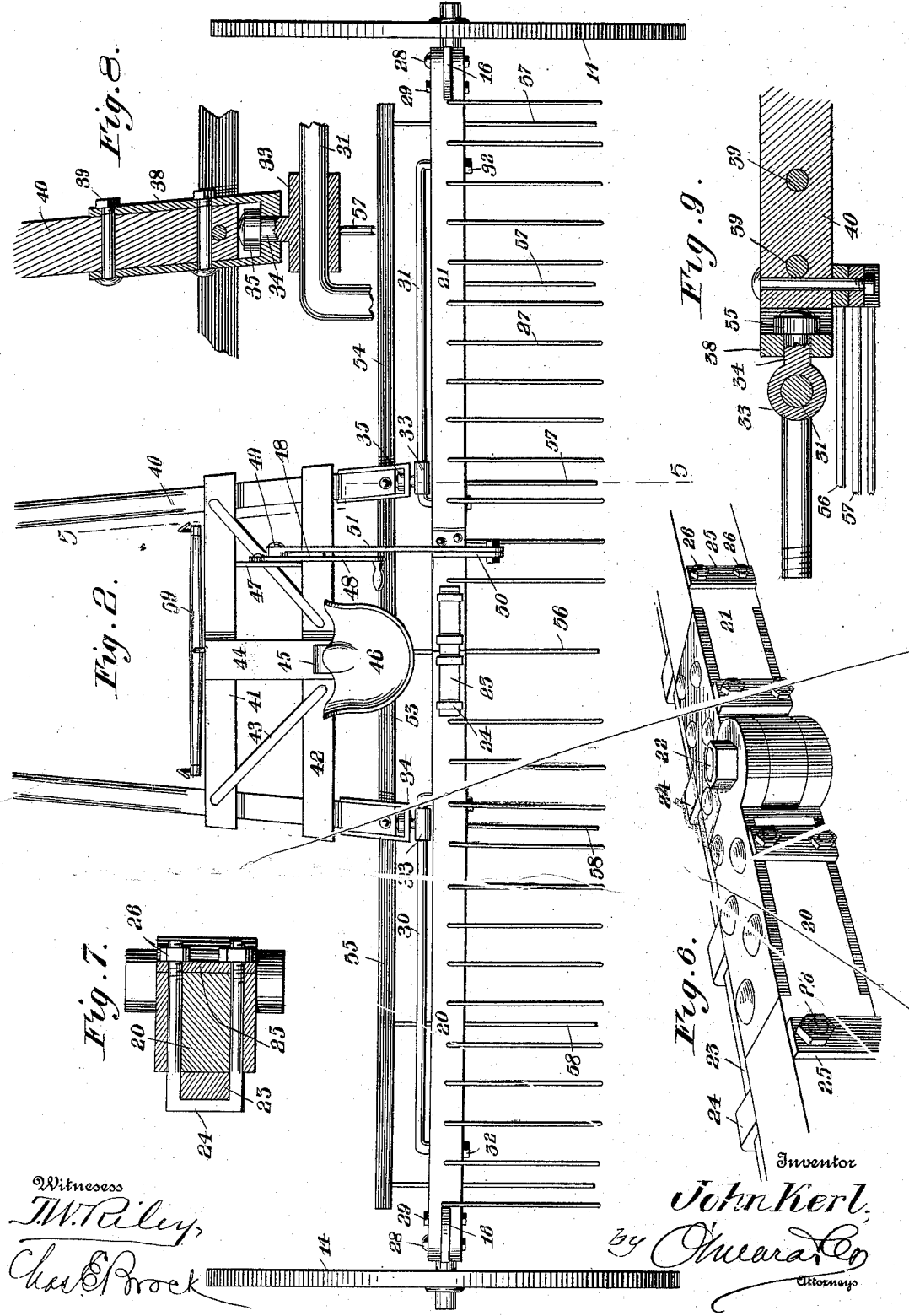
Figure 3:
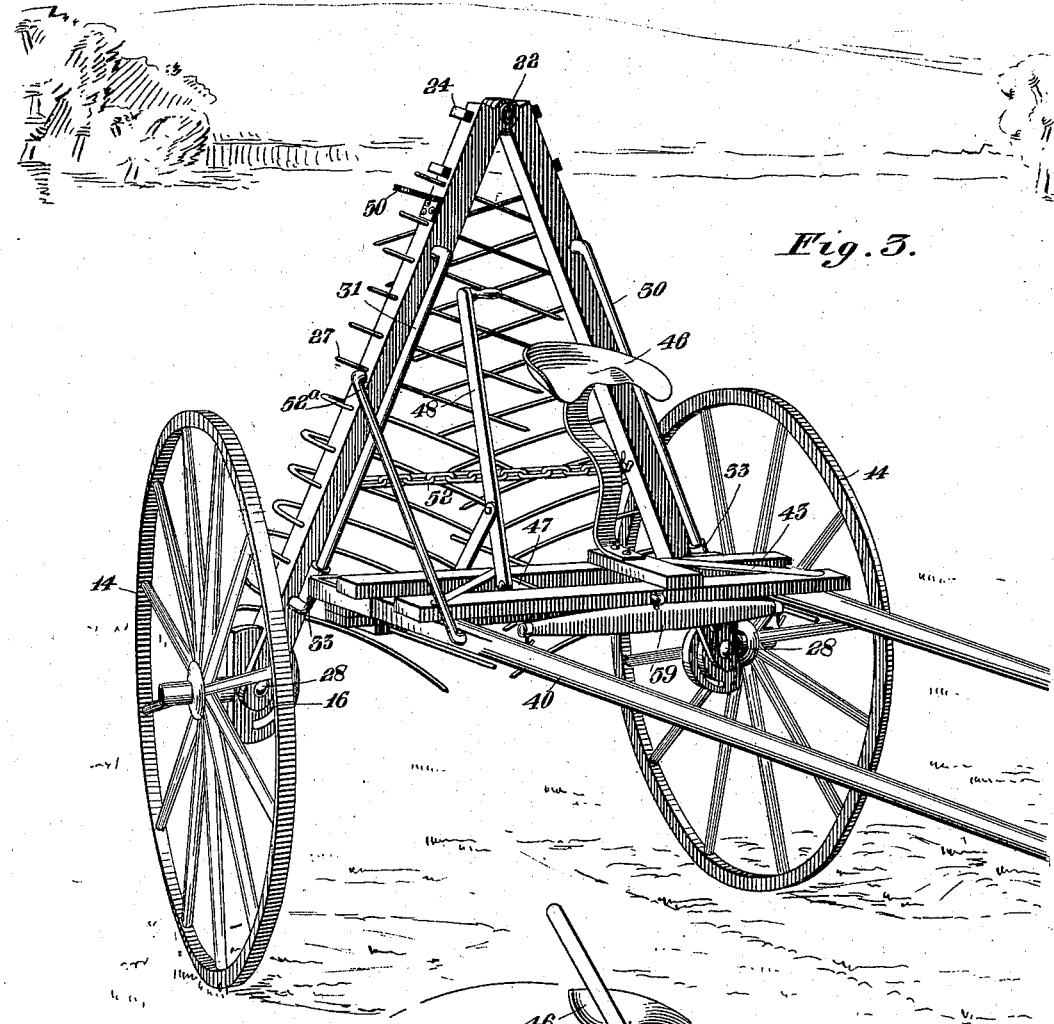
Figure 5:
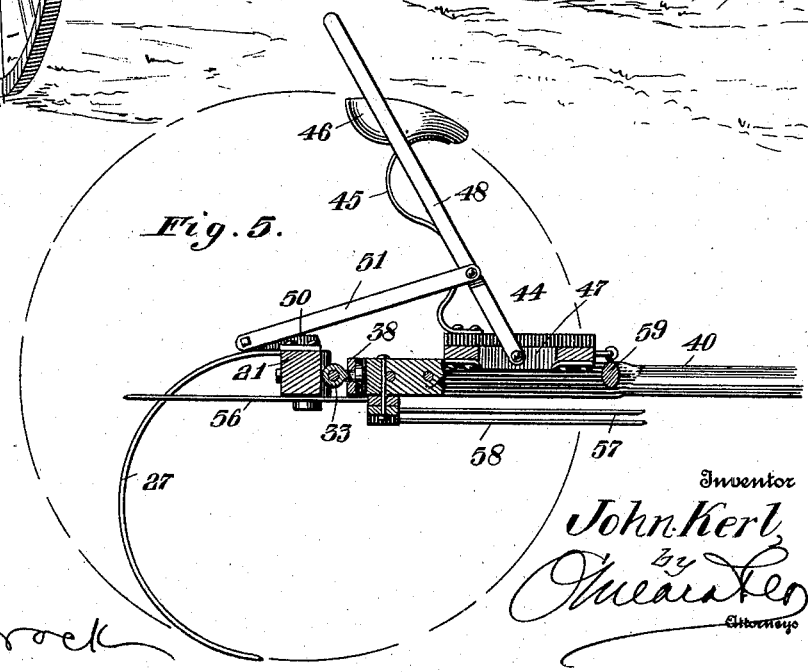

Figure 1 is a perspective view illustrating a horse hay-rake constructed in accordance with my invention. Fig. 2 is a top plan view of the same, the thills being broken away. Fig. 3 is a perspective view illustrating the rake with the teeth and strippers folded for transportation, &c. Fig. 4 is a transverse vertical section through the same on a line cutting through the rear portion of the thills. Fig. 5 is a longitudinal sectional view showing the strippers folded and the teeth ready to be raised and folded. Fig. 6 is a detail perspective view illustrating the middle joint of the tooth-beam. Fig. 7 is a detail sectional view through one of the tooth-beams. Fig. 8 is a detail horizontal sectional view through the joint between the rear end of one of the thills and tooth-beams. Fig. 9 is a detail vertical sectional view through the same parts. Fig. 10 is a detail vertical sectional view through one of the joints between the tooth-beam and the axle-spindle. Fig. 11 is a plan view of one of the spindles. Fig. 12 is a similar view of a spindle of a slightly-modified form. Fig. 13 is a detail perspective view of the hook-bar for holding the tooth-beams in their upper position. Fig. 14 is a detail view illustrating means for holding the clearer-bars in their operative or extended positions, only one of the clearer-bars and its holding mechanism being shown.

Like numerals of reference mark the same parts wherever they occur in the various figures of the drawings.

Referring to the drawings by numerals, 14 indicates the wheels upon which the rake is supported, which are of any ordinary construction and are mounted upon spindles 15, which are formed with plates 16, projecting inwardly and provided with openings 17 and semicircular slots 18, or, as in the modifications shown in Fig. 12, with a semicircular row of openings 19.

20 and 21 are two horizontal beams pivotally connected together at their inner ends by a bolt 22 and held rigidly in line with each other, when desired, by a sliding bolt 23, fitted in clips 24, the ends of which pass through the beams 20 and 21 and have on their projecting ends plates 25 and securing-nuts 26. The beams 20 and 21 carry the usual curved rake-teeth 27. The outer ends of the beams 20 and 21 are pivotally connected with the spindle-plates 16 by bolts 28, passing through said bifurcated ends and the central openings 17 in said plates. Each beam is provided with an adjusting-bolt 29, which passes through the slot 18 in the spindle-plate, said slot being concentric with the connecting-bolt 28 and opening 17, whereby the beams 20 and 21 may be swung upon the connecting-bolt 28, the limit of such swinging motion being determined by the length of the slot and the beams being secured in any adjustment within that limit by tightly turning up the adjusting-bolts 29.

In the modification shown in Fig. 12 to swing the beams the adjusting-bolt 29 must be removed from the opening 19 in which it may be found and again engaged in the necessary openings of the semicircular row to secure the beams at the desired adjustment.

It will be obvious that the longitudinal axes of the bolts 22 and 28 are parallel, so that the movement of the beams upon either of these bolts is uninterrupted. It will be further noticed that the axes of these bolts are at right angles to the spindles 15.

Mounted upon one face of the beams 20 and 21 are guide-rods 30 and 31, said rods having their ends bent at right angles and passed through the beams and secured by bolts 32. Upon these rods are fitted sleeves 33, which are provided with laterally-projecting arms 34, carrying heads 35, which are swiveled in clips 38, secured by bolts 39 to the rear ends by thills or shafts 40, said thills being connected by cross-beams 41 and 42, which are stiffened by braces 43 and connected centrally by a beam 44, to which is secured a spring 45, supporting the saddle 46.

A metal bar 47 connects the cross-beams 41 and 42 to the right of the saddle, and upon this bar a handle-bar 48 is pivotally connected by means of a bolt 49. An arm 50 projects from the beam 21 and is connected by a rod or bar 51 with the handle-bar 48, whereby by oscillating the handle-bar upon its pivot the beams 20 and 21 may be turned to raise the teeth 27 from their lower positions, as shown in Figs. 2 and 5, to their upper positions, as shown in Fig. 1. This adjustment may be performed while the beams 20 and 21 are rigidly connected together by means of the bolt 23, and while still connected the beams may be further turned to bring them into a position at right angles to that of Fig. 1, in which the points of the teeth will be upward, when the bolt 23 may be removed and the beams folded upward into the position shown in Figs. 3 and 4, where they may be secured against separating by means of a chain 52 and a hook-bar 52ᵃ. When this adjustment is made, the link 51 must be disconnected from the arm 50. In this position the wheels are brought near enough together to fit the wagon-tracks of an ordinary road, so that the rake may be hauled from place to place by a horse harnessed in the thills. When this adjustment is made, the spindle-plates 16 will stand vertically, and the bolts 29 may be used to further secure the beams in their proper adjustment, the swivel-joint between the thills and the sleeves 33 and the sliding of the sleeves upon the rods 30 and 31 permitting of this adjustment of the beams without disturbing the level position, the thills being slightly raised during such adjustment.

A cross-bar 53 is rigidly secured to the under side of the thills, and to it are pivoted bars 54 and 55, the former at one end under one thill and the latter at the other end under the other thill. Stripper-teeth 56 are secured to the rigid cross-bar 53 and project to the rear under and beyond the beams 20 and 21 at their joint, while similar teeth 57 and 58 are secured to the pivoted bars 54 and 55. When the rake-teeth are in their lower or operative position, these stripper-teeth all project rearwardly, their relative positions being illustrated in Fig. 2, the pivoted bars 54 and 55 being in their extended position parallel to the beams 20 and 21. Any suitable means may be employed for holding the pivoted clearer-bars 54 and 55 in their extended or operative positions, that shown in Fig. 14 consisting of a ring or cap 60 to pass over the end of the bar 55, said ring being pivotally mounted in a bracket 62, secured to the beam 20 by a pin 61. Similar means will be employed to support the bar 55. While the strippers are in this position the hay gathered by the rake-teeth will be stripped therefrom when the rake-teeth move from the position shown in Figs. 2 and 5 to that shown in Fig. 1, the stripper-teeth preventing any hay from becoming entangled in the rake-teeth. When, however, the beams 20 and 21 carrying teeth are adjusted to the positions shown in Figs. 3 and 4, the pivoted bars 54 and 55 will be folded in under the bar 53 and stripper-teeth 57 and 58 will then project forward under the thills and their connecting-beams, so that the whole rake, including the strippers, will form a compact structure ready to be moved from place to place with as great ease as an ordinary two-wheeled cart.

The thills will be of any ordinary construction and will be furnished with a singletree, as at 59, and all other attachments necessary for the proper harnessing of a horse therein.

The construction and operation of my improved horse-rake will be readily understood from the foregoing description, and it will be evident that I have provided an implement of this class which may be moved from place to place on an ordinary road and by simple adjustments may be converted into a wide rake at the point of operation. The parts are simply and strongly constructed, and therefore may be cheaply made and are not liable to breakage or wear under ordinary usage.

While I have illustrated and described what I consider the best means for carrying out my invention, I do not wish to be understood as restricting myself to the exact construction and arrangement shown and described, but hold that any slight changes or variations such as might suggest themselves to the ordinary mechanic would properly fall within the limit and scope of my invention, and this applies especially to the stripper and manner of folding same.

Having thus fully described my invention, what I claim as new, and desire to secure by Letters Patent of the United States, is—

1. In a horse hay-rake, the combination of two beams carrying rake-teeth, pivoted together at their center, end to end, wheels, spindles upon which said wheels are mounted, flat plates secured to or formed with the inner ends of the spindles, having central openings and curved slots, and pivotal bolts passing through the ends of the beams and said slots, whereby the beams may be folded on their central pivot and turned upon the spindles, substantially as described.

2. In a horse hay-rake, the combination of two beams carrying rake-teeth, pivoted together at their center, end to end, wheels, spindles upon which said wheels are mounted, flat plates secured to or formed with the inner ends of the spindles, having central openings and curved slots, pivotal bolts passing through the ends of the beams and said slots, an arm connected to the beam, a pivoted handle-bar, and a rod connecting the arm and handle-bar, substantially as described.

3. In a horse hay-rake, the combination of two beams adapted to fold upwardly on a central pivot, and stripper-teeth beams adapted to fold horizontally under the thills, substantially as described.

4. In a horse hay-rake, the combination of the tooth-beams centrally pivoted together, the wheels and spindles, the spindle-plates pivotally connected to the ends of the beams, the guide-rods secured to the tooth-beams, sleeves fitted to slide on said rods, the thills, and the swivel connection between the sliding sleeves and thills, substantially as described.

JOHN KERL.

Witnesses:
C. W. ORWIG,
A. N. HETRICK.